United States Patent [19]

Louis et al.

[11] Patent Number: 4,784,523

[45] Date of Patent: Nov. 15, 1988

[54] METHOD AND APPARATUS FOR REMOTELY ORIENTING A FLOWLINE FOR CONNECTION TO A SUBSEA STRUCTURE

[75] Inventors: Bill G. Louis; Ronald C. Mack, both of Houston, Tex.

[73] Assignee: Exxon Production Research Company, Houston, Tex.

[21] Appl. No.: 31,342

[22] Filed: Mar. 26, 1987

[51] Int. Cl.⁴ .......................... F16L 1/04; E21B 43/01
[52] U.S. Cl. ...................... 405/169; 166/343; 166/347
[58] Field of Search ............... 405/158, 169, 170, 195; 166/341, 343, 344, 345, 347

[56] References Cited

U.S. PATENT DOCUMENTS

| | | | |
|---|---|---|---|
| 3,690,112 | 9/1972 | Pattison et al. | 405/169 |
| 3,973,625 | 8/1976 | Baugh | 166/343 |
| 4,277,202 | 7/1981 | Archambaud et al. | 405/169 |
| 4,457,378 | 7/1984 | Watkins | 166/347 |
| 4,459,065 | 7/1984 | Morton | 405/169 |
| 4,591,292 | 5/1986 | Stevens et al. | 405/169 |
| 4,641,998 | 2/1987 | Baugh | 405/169 |

Primary Examiner—David H. Corbin
Attorney, Agent, or Firm—Alfred E. Equitz; Keith A. Bell

[57] ABSTRACT

A method and apparatus for orienting a flowline so that it may be remotely connected to a riser connected to an offshore structure. The apparatus includes a structural guide, connected to the offshore structure, that is capable of being rotated so that the front side of the structural guide is directed toward the lead end of the flowline. The structural guide is designed in such a manner so that is is automatically rotated by the cable which is used to pull the flowline to the offshore structure when tension is applied to the cable. The lead end of the flowline is directed upwardly by a pipe guide. The pipe guide has riser guidepost receptacles that receive guideposts as they are lowered from the offshore structure by guidelines. The guidelines and guideposts direct the riser into position over the lead end of the flowline for final connection.

27 Claims, 4 Drawing Sheets

METHOD AND APPARATUS FOR REMOTELY ORIENTING A FLOWLINE FOR CONNECTION TO A SUBSEA STRUCTURE

FIELD OF THE INVENTION

This invention relates generally to an apparatus and method for orienting a flowline for remotely connecting the flowline with a subsea structure. More specifically it relates to an apparatus and method for accurately positioning the lead end of the flowline within a prescribed target area on the seabed for final connection to a riser.

BACKGROUND OF THE INVENTION

Incident to many marine operations is a need to transport liquids or gases through a subsea flowline from an offshore location to a more readily accessible location. For example, in the oil and gas industry, many offshore production systems have production risers extending from the ocean floor to the production platform. This is particularly common with fixed platforms and tensioned leg platforms. To transport the liquid or gas produced by way of subsea flowlines, the flowlines are preferably connected to the riser at or near the ocean floor.

A particular problem arises when such connections are to be made in relatively deep waters, for example 300 feet or more. At such depths it is difficult, and often impossible, to use divers to aid in the final alignment and connection of the flowline with the riser. Thus, in deeper waters it is usually necessary to make the final alignments and connections from a remote location.

One method used today for remotely aligning and connecting the flowline with the riser, is disclosed in U.S. Pat. No. 3,690,112 which issued Sept. 12, 1972 to Pattison et al. This method employs a pipe guide, a mating receiver, a riser guide and a power driven pull-in cable. The pipe guide is a sled-like guide connected to the lead end of the flowline. The lead end of the flowline is curved so that the mouth of the flowline is directed about 90° from the direction of the portion of the flowline away from the lead end. The flowline is connected to the pipe guide so that the curved portion points in an upwardly direction. The pipe guide, with the flowline, is moved by the pull-in cable to the structural guide which is fixedly attached to an offshore structure. The structural guide has at least one mating element and the pipe guide has the counterpart. The mating element is a female mating receiver that is formed to receive the male counterpart of the pipe guide. Once the pipe guide connects with the structural guide the flowline is in position for final connection to the riser. The riser is directed into position for connection to the flowline through a tubular riser guide which is also fixedly attached to the offshore structure. Once both the riser and the flowline are in position, the final connection is made.

One problem with the method disclosed above arises when the flowline and the pipe guide are not directly in line with the structural guide. As the pull-in cable draws the pipe guide toward the mating receiver, the flowline is forced out of its relaxed position as it is moved into direct alignment with the mating receiver. This puts the flowline into a stressed condition, creating an increased risk for future cracks or leaks. Furthermore, in order to move the flowline into direct alignment a stronger power source and pull-in cable are needed than would be needed if the flowline would be in its relaxed state when coupled with the structural guide.

Secondly, since the lead end of the flowline and the riser must have the same angular orientation, the method described above requires precise orientation of the flowline within the pipe guide. Slight variations in the curvature of the lead end of the flowline or in the angle of orientation of the flowline within the pipe guide can have a significant impact on the final alignment, making a remote connection quite difficult.

A second method for pulling a flowline to a subsea structure and remotely aligning it with a riser is disclosed in U.S. Pat. No. 4,591,292 which issued May 27, 1986 to Stevens, et al. By this method, the pull-in cable pulls the flowline to a rotatable alignment receiver. Once the flowline connects to the receiver, an electrical or hydraulic motor rotates the receiver which in turn adjusts the position and angular orientation of the flowline head for final connection with a riser.

Using the method of Stevens' et al., the flowline may be forced out of its relaxed state when it is connected to the alignment receiver if the horizontal orientation of the flowline is not in direct line with the alignment receiver. Once connected to the receiver, the lead end of the flowline is twisted or turned into position with the riser by the receiver. This increases the stress on the flowline and on the connection between the flowline and riser, thereby creating a greater risk of cracking or future leakage, in addition to increasing the complexity and number functions of the receiver.

It would be desirable to develop a method and apparatus to accurately align a subsea flowline with an offshore structure for connection thereto, from a remote location, that does not cause stress to the flowline and that allows for angular variations or positioning inaccuracies in the orientation of the lead end of the flowline, with a minimal number of mechanical connections and movement functions of the receiver.

SUMMARY OF THE INVENTION

The present invention is an apparatus and method to orient a flowline for remotely connecting it with a subsea structure. In a preferred embodiment, the flowline which is attached to a pipe guide is pulled in to a structural guide by a pull-in device. The structural guide, which is attached to the offshore structure, is capable of being rotated so that its front side will face the flowline. The structural guide has at least one female mating receiver. The pipe guide has a male mating device which is adapted to be received within the female mating receiver of the structural guide. The pipe guide in a preferred embodiment also has two riser guidepost receptacles which are attached to the pipe guide in a known relationship with the lead end of the flowline. Once the male mating device slides into the female mating receiver and the pipe guide is connected to the structural guide, riser guideposts are lowered into the riser guidepost receptacles by riser guidelines. Then the riser along with an attached riser connection device is lowered to the lead end of the flowline, being directed into final position by the riser connection device sliding over the riser guidelines and riser guideposts. This method and apparatus accurately aligns a flowline with a riser for connection thereto from a remote location while leaving the flowline in a relaxed position.

The drawings are not intended as a definition of the invention but are provided solely for the purpose of illustrating certain preferred embodiments of the invention as described below.

DETAILED DESCRIPTION OF THE PREFERRED EMBODIMENT

Figure 1:
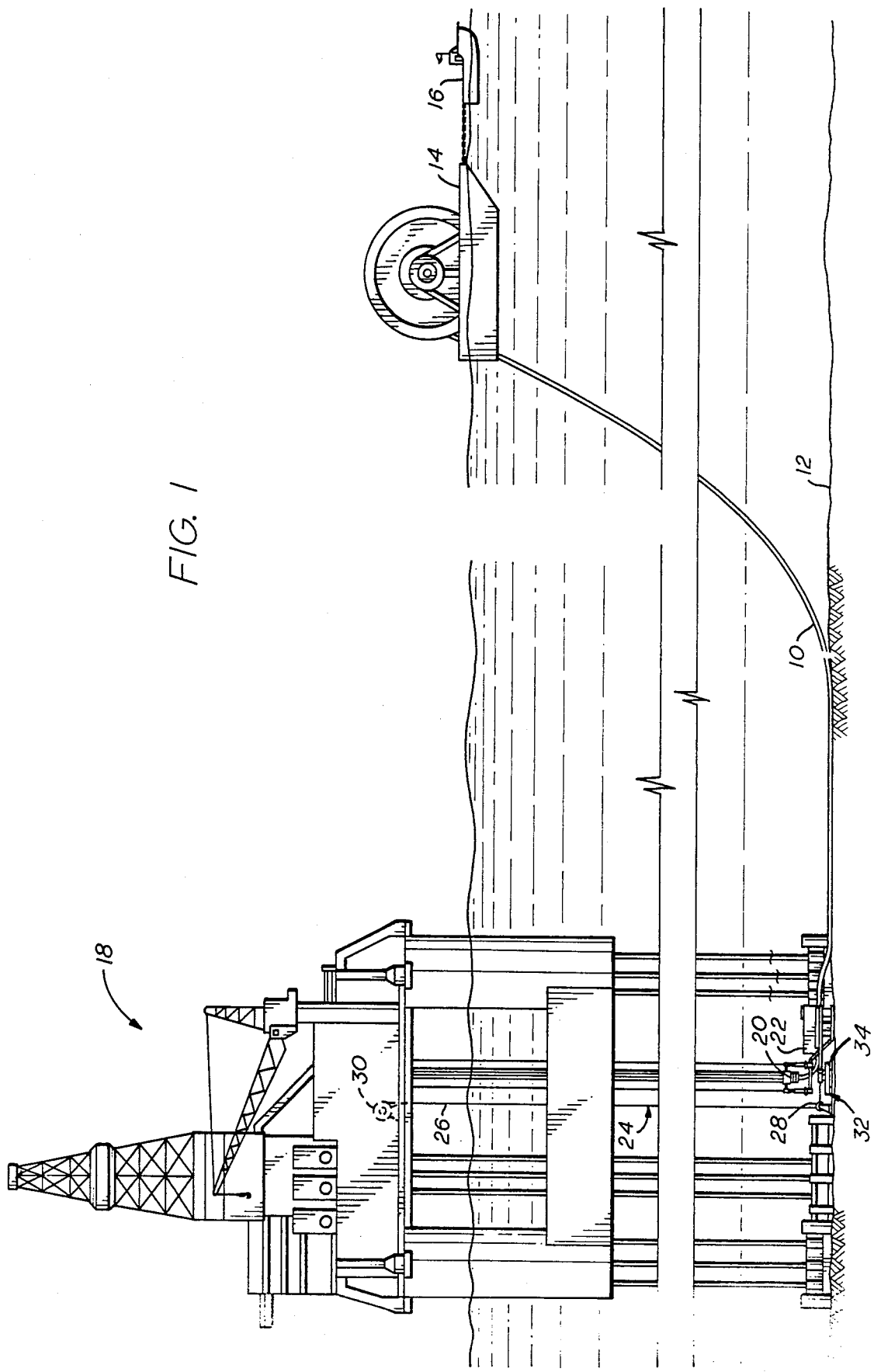
FIG. 1 is a side elevational view showing the apparatus of invention.

FIG. 1 broadly illustrates one use of the inventive system. Flowline 10 is laid on ocean floor 12 by lay barge 14 which is often aided by a tugboat 16. Flowline 10 is laid as near as possible to offshore structure 18 which, in the illustration, is a tensioned leg platform. Lead end 20 of flowline 10 is directed upward at an angle of about 90° from the horizontal axis of flowline 10 by pipe guide 22. Pipe guide 22 is capable of being pulled along ocean floor 12 like a sled to offshore structure 18 by pull-in device 24. Pull-in devices are known in the art and will not be described in detail in this application. Pull-in device 24 includes at least one cable 26 arranged along pulleys 28 and hoisted by winch 30. Pull-in device 24 pulls pipe guide 22 and flowline 10 to offshore structure 18 where pipe guide 22 is connected to structural guide 32. Structural guide 32 is attached to offshore structure 18 at or near ocean floor 12, and it is capable of being rotated about a substantially vertical axis so that its front side 34 faces lead end 20 of flowline 10. Once pipe guide 22 is connected to structural guide 32, lead end 20 of flowline 10 will be substantially in line with the axis of structural guide 32. As a result, lead end 20 of..flowline 10 is within the prescribed target area so that a riser 62 (best shown in FIG. 9) may be aligned with lead end 20 of flowline 10 for final connection.

Figure 2:
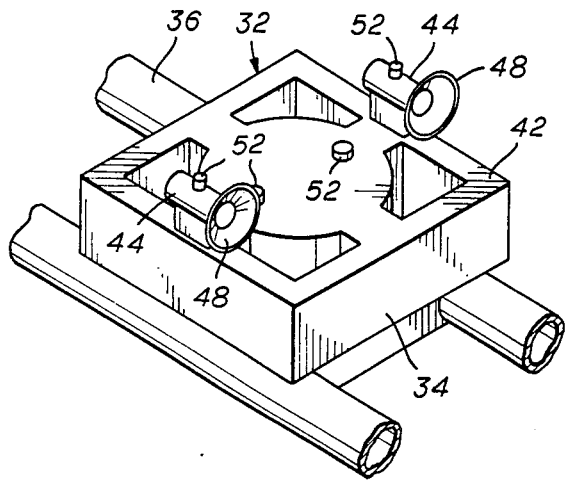
FIG. 2 is an perspective view of a preferred embodiment of the inventive structural guide which includes a rotary table.
Figure 3:
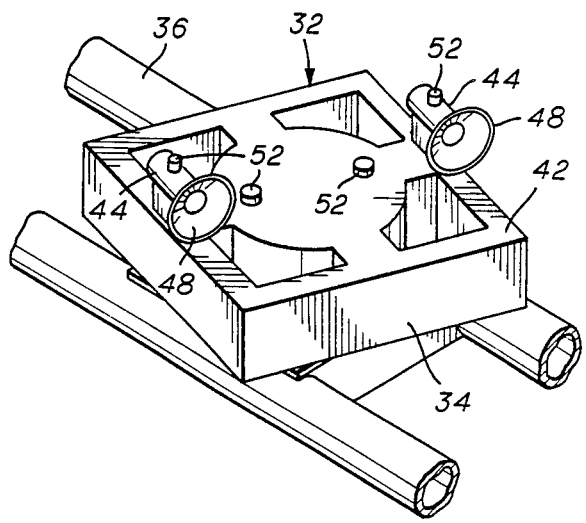
FIG. 3 is an perspective view of the structural guide of FIG. 2 with the rotary table turned approximately fifteen degrees.
Figure 4:
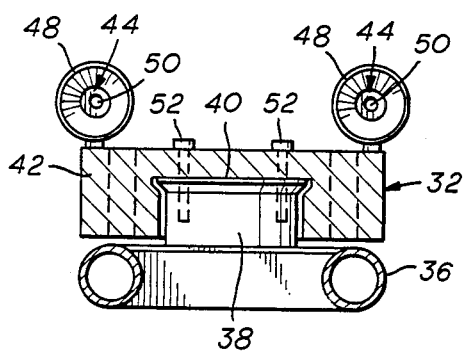
FIG. 4 is a front elevational view, in partial section, of the structural guide of FIG. 2.
Figure 7:
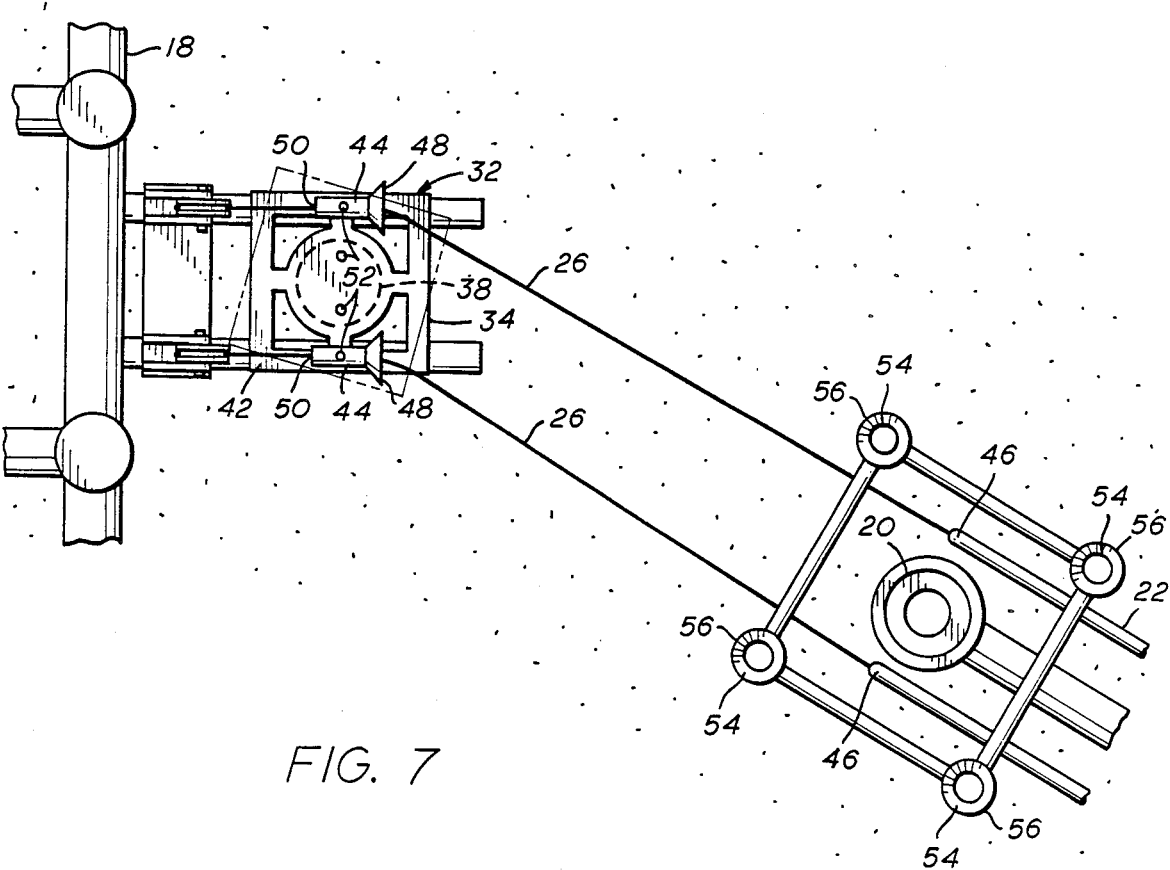
FIG. 7 is a top view of the pipe guide of FIG. 6 being pulled in toward the structural guide illustrating a preferred method of rotating the rotary table of the structural guide.

FIGS. 2, 3 and 4 illustrate a preferred embodiment of structural guide 32. Structural guide 32 has a base 36 which is attached to offshore structure 18. Base 36 supports a rotary platform 38 (shown in FIG. 4 only) which is preferably cylindrical in shape with either a flat or rounded top surface 40. Top surface 40 is preferably coated with a non-stick substance (not shown) such as polytetrafluoroethylene which enables rotary table 42, which rests on and over rotary platform 38, to be rotated to the desired direction as shown in FIGS. 3 and 7. Attached to rotary table 42 are two female mating receivers 44 adapted to receive male mating devices 46 (see FIG. 7) which are part of pipe guide 22. The mating receivers 44 may be tubular or conical with a flanged end 48.

Figure 5:
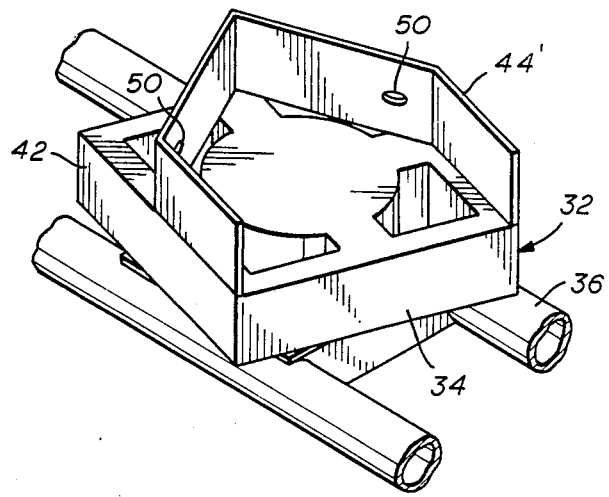
FIG. 5 is an perspective view of a structural guide having only one female mating receiver.

Structural guide 32 is also provided with cable passageways 50. Each passageway 50 may be an aperture through female mating receiver 44 as illustrated in FIGS. 4 and 5 or may extend through a member (not shown) attached to the surface of female mating receiver 44 or to rotary table 42. By threading the cables 26 of the pull-in device 24 through the cable passageways 50, the cables 26 will force rotary table 42 to rotate into substantial alignment with lead end 20 of flowline 10 when pull-in device 24 begins to draw pipe guide 22 toward offshore structure 18 (see FIG. 7). As pipe guide 22 nears structural guide 32, male mating device 46 will catch the flanged end 48 of female mating receiver 44 causing structural guide 32 to further rotate into direct alignment with the flowline 10 so that male mating device 46 may slide into female mating receiver 44. Pipe guide 22 and flowline 10 may then be pulled into final position, while keeping the flowline 10 in a relaxed state. If desired, pipe guide 22 may be locked into place by passive locks 52. Passive locks are known in the art and will not be further described herein.

FIG. 5 illustrates an alternative embodiment of structural guide 32 having only one female mating receiver 44' (44 prime). In this embodiment female mating receiver 44' is sheetlike, partially encompassing rotary table 42

In this embodiment, the male mating device on pipe guide 22 should be similar in shape to female mating receiver 44', but slightly smaller so that it may be received within female mating receiver 44' when pipe guide 22 is pulled to structural guide 32.

Figure 6:
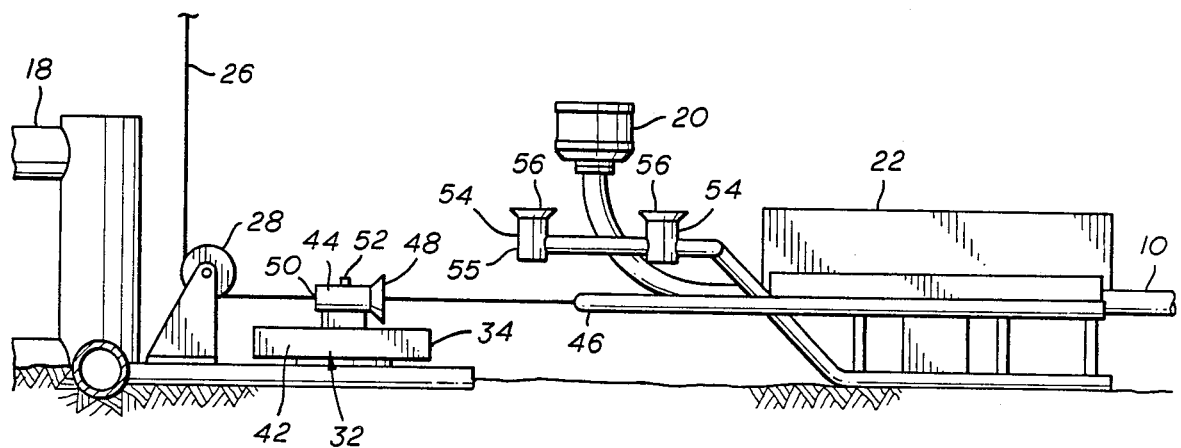
FIG. 6 is a side view of the flowline being pulled in by the pull-in device illustrating a preferred embodiment of the inventive pipe guide.

FIG. 6 illustrates a preferred embodiment of pipe guide 22. Since pipe guides are generally known in the art, only the features of particular significance to the invention will be described herein. Those features include male mating device 46 and riser guidepost receptacles 54. Male mating device 46 is located near lead end 55 of pipe guide 22 so that when male mating device 46 is received within female mating receiver 44, the axis of lead end 20 of the flowline 10 will be substantially in line with the axis about which the structural guide 32 rotates. The shape of device 46 is dependant upon the shape of female mating receiver 44. In a preferred embodiment male mating device 46 has shape matching that of female mating receiver 44, but is slightly smaller than receiver 44 in order to slide within mating receiver 44 when pipe guide 22 is drawn to structural guide 32 by pull-in device 24. Riser guidepost receptacles 54 may vary in size, shape and number. In a preferred embodiment, there are at least two guidepost receptacles 54 arranged evenly about lead end 20 of flowline 10 s flowline 10 rests within pipe guide 22. Guidepost receptacles 54 are preferably tubular with a flange 56. However guidepost receptacles 54 may also be conical or funnel-like. Receptacles 54 are preferably directed upwardly, having substantially the same angular orientation as lead end 20 of flowline 10.

FIG. 7 is a top view of pipe guide 22 ready to be pulled in toward female mating receiver 44. In its initial position, structural guide 32 is approximately square with offshore structure 18 with its front side 34 facing away from offshore structure 18 toward the expected direction of flowline 10. In a preferred embodiment, cables 26 are threaded through cable passageways 50 and through female mating receivers 44 and connect to male mating devices 46. As winch 30 applies tension to cables 26, the cables 26 straighten and become taut. The straightening of cables 26 forces rotary table 42 to pivot on top surface 40 of rotary platform 38 until front side 34 of structural guide 32 faces pipe guide 22 as illustrated by the dashed line.

Figure 8:
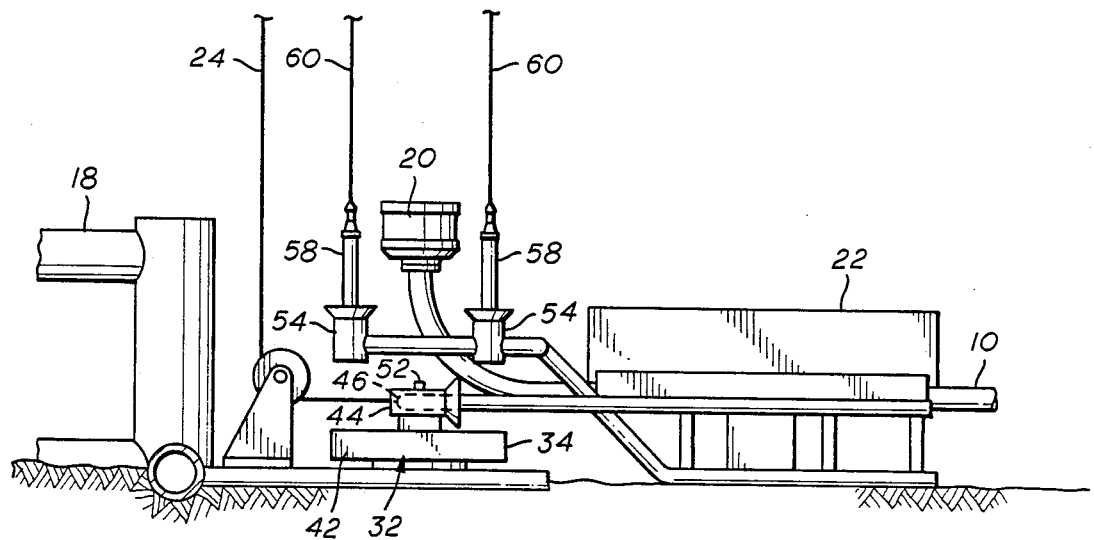
FIG. 8 is a side view of the pipe guide engaged with the rotatable structural guide with the pull-in cable removed and the riser guideposts installed.

FIG. 8 illustrates the installation of riser guideposts 58 into riser guidepost receptacles 54. Once pipe guide 22 is engaged with structural guide 32, pull-in device 24 may be removed. Guideposts 58 are lowered into guidepost receptacles 54 by riser guidelines 60. Riser guidelines 60 are preferably attached to the upper end of guideposts 58.

Figure 9:
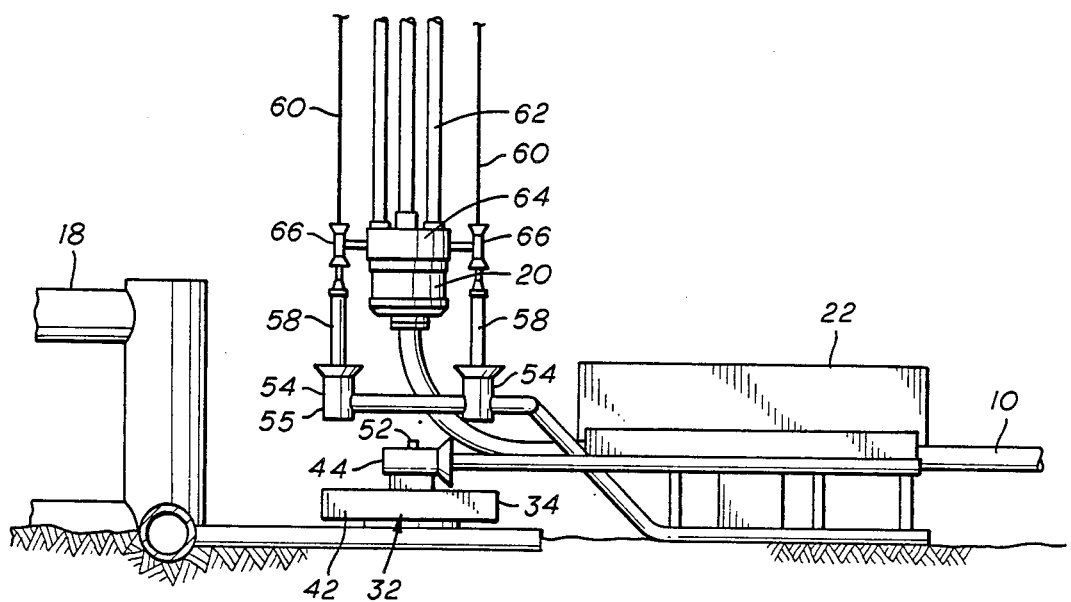
FIG. 9 is a side view of a riser being aligned with the lead end of the flowline by the guideposts.

FIG. 9 illustrates how riser 62 with riser connection device 64 are directed into position by riser guidelines 60 and riser guideposts 58. A fixture 66, which is adapted to slide over riser guidelines 60, orients riser 62 and riser connection device 64 directly over lead end 20 of the flowline 10. A separate fixture 66 is not necessary if riser connection device 64 is designed so it is capable of performing the same function as fixture 66. Once riser 62 is connected to lead end 20, fixture 66 and guideposts 58 may be removed.

While the present invention is especially well-suited for use in conjunction with marine oil and gas producing equipment and is discussed with reference to such use, the invention may be embodied in any other operation where a flowline must be connected to an offshore structure. The preferred embodiments and preferred methods of using it have been discussed above. It should be understood that the foregoing description is illustrative, and that other embodiments of the invention can be employed without departing from the scope of the invention as set forth in the following claims.

What we claim is:

1. An apparatus for aligning a flowline having a lead end with an offshore structure extending upwardly from the bottom of a body of water for connection to a riser having a lower end and being associated with the offshore structure comprising:
    a pipe guide for holding the lead end of the flowline and for directing the lead end of the flowline upwardly, the pipe guide having a lead end and being capable of being pulled along the bottom of the body of water, the pipe guide being attached to the lead end of the flowline;
    a structural guide having a front side, the structural guide being attached to the offshore structure and being rotatable along a substantially vertical axis so that the front side faces toward the pipe guide;
    a pull-in device connected to the offshore structure for pulling the pipe guide to the structural guide for connection thereto;
    at least one riser guidepost for directing the lower end of the riser into alignment with the lead end of the flowline for connection thereto once the pipe guide is connected to the structural guide;
    at least one riser guidepost receptacle attached to the pipe guide in such a manner that the riser guidepost receptacle has substantially the same angular orientation as the lead end of the flowline, the riser guidepost receptacle being adapted to receive the riser guidepost; and
    a riser connection device for connecting the lower end of the riser to the lead end of the flowline, the riser connection device being attached to the lower end of the riser and being adapted to mate with the riser guidepost and seat upon the lead end of the flowline.

2. The apparatus of claim 1 further comprising means for locking the pipe guide to the structural guide once the pipe guide is pulled to the structural guide.

3. The apparatus of claim 1 further comprising a riser guideline for lowering the riser guidepost to the riser guidepost receptacle, the riser guideline being attached to one end of the riser guidepost.

4. The apparatus of claim 1 wherein the pull-in device comprises a cable.

5. The apparatus of claim 4 wherein the structural guide comprises:
    a base attached to the offshore structure;
    a rotary platform extending upwardly from the base and having a top surface;
    a rotary table pivotally attached to the top surface of the rotary platform; and
    a member having a cable passageway therethrough connected to the rotary table and adapted to allow the cable to pass through the cable passageway so that when tension is applied to the cable, the cable will straighten and cause the rotary table to rotate until the front side of the structural guide faces the pipe guide.

6. The apparatus of claim 5 wherein the rotary platform is cylindrical.

7. The apparatus of claim 5 wherein the structural guide further comprises a female mating receiver for directing the pipe guide into position, the female mating receiver being attached to the rotary table.

8. The apparatus of claim 7 wherein the female mating receiver is the member having a cable passageway therethrough, and the female mating member has tubular shape.

9. The apparatus of claim 7 wherein the female mating receiver is in sheet form having an aperture to serve as the cable passageway.

10. The apparatus of claim 7 wherein the pipe guide comprises a male mating device attached to the lead end of the pipe guide and adapted to be received within the female mating receiver when the pipe guide is pulled to the structural guide.

11. The apparatus of claim 5, wherein the rotary table is capable of rotating about a substantially vertical axis when acted upon by the cable.

12. An apparatus for aligning a flowline having a lead end with an offshore structure for connection to a riser having a lower end and being associated with the offshore structure, comprising:
    a pipe guide attached to the lead end of the flowline in such a manner that the pipe guide directs the lead end upwardly, the pipe guide directs the lead end;
    a structural guide having a base connected to the offshore structure and a rotary table resting on the base, the rotary table having a front side and being capable of being rotated about a substantially vertical axis so that the front side faces the pipe guide;
    a pull-in device connected to the offshore structure and having a cable for pulling the pipe guide to the structural guide for connection thereto;
    at least one riser guidepost for directing the riser into alignment with the lead end of the flowline for connection thereto once the pipe guide is engaged with the structural guide;

at least one riser guidepost receptacle attached to the pipe guide in such a manner that the riser guidepost receptacle has substantially the same angular orientation as the lead end of the flowline, the riser guidepost receptacle being adapted to receive the riser guidepost;

at least one riser guideline for lowering the riser guidepost to the riser guidepost receptacle, the riser guideline having a first end attached to the offshore structure and a second end attached to the riser guidepost; and a riser connection device attached to the riser and adapted to be lowered along the riser guideline and to mate with the riser guidepost so that the riser may be connected to the lead end of the flowline.

13. The apparatus of claim 12 further comprising means for locking the pipe guide to the structural guide once the pipe guide is pulled to the structural guide.

14. The apparatus of claim 12 wherein the structural guide further comprises a member forming a cable passageway connected to the rotary table and adapted to allow the cable of the pull-in device to pass through the cable passageway so that when tension is applied to the cable, the cable will straighten and cause the rotary table to rotate.

15. The apparatus of claim 12 wherein the structural guide further comprises a female mating receiver attached to the rotary table for directing the pipe guide into position.

16. The apparatus of claim 15 wherein the female mating receiver is substantially tubular and has a cable passageway therethrough for allowing the cable to pass through the cable passageway so that when tension is applied to the cable, the cable will straighten and cause the rotary table to rotate.

17. The apparatus of claim 15 wherein the female mating receiver is in sheet form having an aperture serving as a cable passageway for allowing the cable to pass through the cable passageway so that when tension is applied to the cable, the cable will straighten and cause the rotary table to rotate.

18. The apparatus of claim 15 wherein the pipe guide further comprises a male mating device attached to the lead end of the pipe guide, the male mating device capable of being received within the female mating receiver when the pipe guide is pulled to the structural guide.

19. An apparatus for aligning a flowline having a lead end with an offshore structure extending upwardly from the bottom of a body of water for connection to a riser attached to the offshore structure, comprising:

a pipe guide attached to the lead end of the flowline in such a manner that the pipe guide directs the lead end upwardly, the pipe guide being capable of being pulled along the bottom of the body of water, the pipe guide having a riser guidepost receptacle attached in such a manner that, when the pipe guide is connected to the structural guide, the riser guidepost receptacle has substantially the same angular orientation as the lead end of the flowline;

a structural guide having a base connected to the offshore structure and a rotary table resting on the base, the rotary table having a front side and being capable of being rotated about a substantially vertical axis so that the front side faces the pipe guide;

a pull-in device connected to the offshore structure and having a cable for pulling the pipe guide to the structural guide;

at least one riser guidepost attached to the offshore structure by a riser guideline for directing the riser into alignment with the lead end of the flowline for connection thereto once the pipe guide is connected to the structural guide, the riser guidepost being capable of being received within the riser guidepost receptacle when lowered to the riser guidepost receptacle by the riser guideline; and a riser connection device for connecting the riser to the lead end of the flowline, the riser connection device being adapted to slide along the riser guideline and mate with the riser guidepost.

20. The apparatus of claim 19 further comprising means for securing the pipe guide to the structural guide once the pipe guide reaches the structural guide.

21. The apparatus of claim 19 wherein the structural guide further comprises a member forming a cable passageway connected to the rotary table and adapted to allow the cable of the pull-in device to pass through the cable passageway so that when tension is applied to the cable, the cable becomes taut and causes the rotary table to rotate until the front side faces the pipe guide.

22. The apparatus of claim 19 wherein the structural guide further comprises a female mating receiver for directing the pipe guide into position, the female mating receiver being attached to the rotary table.

23. The apparatus of claim 22 wherein the female mating receiver is substantially tubular and has a cable passageway therethrough for allowing the cable to pass through the cable passageway so that when tension is applied to the cable, the cable becomes taut and causes the rotary table to rotate until the front side is directed toward the pipe guide.

24. The apparatus of claim 22 wherein the female mating receiver is in sheet form having an aperture to serve a cable passageway capable of allowing the cable to pass through so that when tension is applied to the cable, the cable becomes taut and causes the rotary table to rotate until the front side faces the pipe guide.

25. The apparatus of claim 22 wherein the pipe guide further comprises a male mating device capable of being received within the female mating receiver when the pipe guide is pulled to the structural guide.

26. A method for aligning a flowline having a lead end and a riser guidepost receptacle attached to the lead end to a riser attached to an offshore structure where the structure includes a structural guide having a front side and the offshore structure extends upwardly from the bottom of a body of water comprising the step of:

rotating the structural guide about a substantially vertical axis until the front side of the structural guide faces the lead end of the flowline;

pulling the lead end of the flowline to the structural guide by a cable;

securing the lead end of the flowline to the structural guide;

directing a riser guidepost suspended from the offshore structure by a guideline into the riser guidepost receptacle; and lowering the riser, having a riser connection device attached, along the riser guidepost in such a manner that the riser aligns with the lead end of the flowline.

27. The method of claim 26 wherein the step of pulling the lead end of the flowline causes the structural guide to rotate.

* * * * *